(12) United States Patent
Le Traon et al.

(10) Patent No.: US 9,494,472 B2
(45) Date of Patent: Nov. 15, 2016

(54) DEVICE FOR MEASURING THE TEMPERATURE OF A VIBRATING BEAM AND APPLICATION TO THE IMPROVEMENT OF THE PRECISION OF MEASUREMENT OF A VIBRATING-BEAM SENSOR

(75) Inventors: Oliver Le Traon, Vauhallan (FR); Claude Chartier, Massy (FR); Vincent Gaudineau, Palaiseau (FR); Jean Guerard, Juvisy (FR); Denis Janiaud, Les Ulis (FR); Raphaël Levy, Paris (FR)

(73) Assignee: OFFICE NATIONAL D'ETUDES ET DE RECHERCHES AEROSPATIALES (ONERA), Chatillon (FR)

( * ) Notice: Subject to any disclaimer, the term of this patent is extended or adjusted under 35 U.S.C. 154(b) by 641 days.

(21) Appl. No.: 13/981,056

(22) PCT Filed: Jan. 23, 2012

(86) PCT No.: PCT/FR2012/000030
§ 371 (c)(1),
(2), (4) Date: Sep. 17, 2013

(87) PCT Pub. No.: WO2012/101350
PCT Pub. Date: Aug. 2, 2012

(65) Prior Publication Data
US 2014/0016666 A1 Jan. 16, 2014

(30) Foreign Application Priority Data

Jan. 24, 2011 (FR) .................................... 11 00196

(51) Int. Cl.
*G01K 11/22* (2006.01)
*G01K 11/26* (2006.01)
(Continued)

(52) U.S. Cl.
CPC ............ *G01K 11/26* (2013.01); *G01C 19/5656* (2013.01); *G01H 13/00* (2013.01); *G01K 3/10* (2013.01); *G01K 7/32* (2013.01); *G01P 15/097* (2013.01)

(58) Field of Classification Search
USPC ............................................. 374/117; 331/66
See application file for complete search history.

(56) References Cited

U.S. PATENT DOCUMENTS 4,437,773 A * 3/1984 Dinger ..................... G01K 7/32
310/318
4,448,546 A * 5/1984 Paros ....................... G01K 7/32
310/361

(Continued)

OTHER PUBLICATIONS

International Search Report, dated Jun. 5, 2012, corresponding to PCT/FR2012/000030.

(Continued)

*Primary Examiner* — Mirellys Jagan
(74) *Attorney, Agent, or Firm* — Lewis Roca Rothgerber Christie LLP (57) ABSTRACT

The invention is a device for measuring the temperature of the vibrating beam of a vibrating-beam sensor. It comprises a resonator (10) vibrating in torsion in resonant mode and exhibiting a torsional vibration node (N), said node being its zone of fixing in the vicinity of the middle of the length (L3) of the vibrating beam, said fixing allowing thermal transfers between the resonator and the beam. The frequency of the resonator and the variations of this frequency are representative respectively of the mean temperature T of the beam and of the variations of this temperature T, the effects of which may be compensated by a model.

14 Claims, 4 Drawing Sheets

(51) Int. Cl.
*G01K 3/10* (2006.01)
*G01K 7/32* (2006.01)
*G01P 15/097* (2006.01)
*G01C 19/5656* (2012.01)
*G01H 13/00* (2006.01)

(56) References Cited

U.S. PATENT DOCUMENTS

| | | | |
|---|---|---|---|
| 4,592,663 A * | 6/1986 | EerNisse | G01K 7/32 |
| | | | 310/370 |
| 4,879,914 A | 11/1989 | Norling | |
| 5,156,460 A * | 10/1992 | Norling | G01K 7/32 |
| | | | 310/333 |
| 5,315,874 A | 5/1994 | Petrovich et al. | |
| 5,574,220 A * | 11/1996 | Amand | G01P 15/097 |
| | | | 310/321 |
| 5,962,786 A | 10/1999 | Le Traon et al. | |
| 6,414,416 B1 * | 7/2002 | Janiaud | G01C 19/5607 |
| | | | 310/321 |
| 2004/0011131 A1 * | 1/2004 | Featonby | G01P 15/097 |
| | | | 73/514.15 |
| 2007/0163347 A1 * | 7/2007 | Le Traon | H03H 9/505 |
| | | | 73/514.29 |

OTHER PUBLICATIONS

Azevedo, et al: "Dual-mode temperature compensation for a comb-driven MEMS resonant strain gauge," Sensors and Actuators A: Physical, vol. 144, No. 2, Jun. 15, 2008, pp. 374-380, XP022664318.

Norling "Precision Gravity Measurement Utilizing Accelerex Vibrating Beam Accelerometer Technology," Instrument Systems Division, Sundstrand Data Control, Inc., Mar. 20, 1990, pp. 509-515, XP010001172.

* cited by examiner

DEVICE FOR MEASURING THE TEMPERATURE OF A VIBRATING BEAM AND APPLICATION TO THE IMPROVEMENT OF THE PRECISION OF MEASUREMENT OF A VIBRATING-BEAM SENSOR

CROSS-REFERENCE TO RELATED APPLICATION(S)

This application is a National Phase Patent Application and claims priority to and benefit of International Application Number PCT/FR2012/000030, filed on Jan. 23, 2012, which claims priority to and benefit of French Patent Application Number 11/00196, filed on Jan. 24, 2011, the entire disclosures of which are incorporated herein by reference.

BACKGROUND

The technical field of the invention is that of vibrating beam sensors, which use the sensitivity of the resonance frequency of a vibrating beam to a force exerted along its longitudinal axis, the mechanical phenomenon involved being similar to that which occurs, for example, when tuning a guitar string. The input quantity to be measured by the sensor is, for example, a force, a pressure or an acceleration.

The technical problem to be solved is that of avoiding degradation of the precision of measurement of a vibrating beam sensor when the sensor is subjected to severe conditions of a thermal environment.

The closest prior art brings together the following three approaches:

The first approach teaches the mounting of two vibrating beams in parallel but with axes that are substantially in opposite directions, then considering the difference in their frequencies of flexural vibration in order to eliminate the effect, on said frequencies, of the natural thermal expansion of the beams under the effect of the temperature.

The second approach teaches the arrangement of an additional vibrating beam close to the sensor, which additional vibrating beam is to supply temperature information in frequency form, said information being intended to compensate, by a model, the effects of the temperature on the sensor.

The third approach teaches operation of the sensor with, as the sensitive element, not one but two vibrating beams that form a tuning fork which is able to vibrate simultaneously in flexion mode at a first frequency and in torsion mode at a second frequency. Since each of the two frequencies is sensitive to the input quantity to be measured and to the temperature, after calibration of the device, observation of the two frequencies allows the input quantity and the temperature to be evaluated.

These teachings of the prior art are described in detail below in order to bring to light the disadvantages to which the invention offers a solution.

In order to illustrate the idea, the case of vibrating beam accelerometers (VBA) will be considered, which will be taken to describe these two approaches.

A vibrating beam accelerometer comprises a beam, one end of which is integral with a proof mass and the other end of which is integral with a fixed part, means for inducing flexural vibration of the beam, and an oscillating electronic loop which allows the flexural vibration of the beam to be maintained in resonance mode. The sensitive axis of the accelerometer refers to the direction in which an acceleration creates, by way of the proof mass, an axial force of extension or compression on the vibrating beam, which modifies its mechanical resonance frequency. The output quantity of the accelerometer is accordingly a frequency the variations of which are representative of the acceleration to be measured. The proof mass is generally connected to the fixed part by articulations which are to ensure that the proof mass resists acceleration directions other than the sensitive axis.

In order that the vibration of the beam has a good quality coefficient, and so that the measurement resolution of the accelerometer is satisfactory, the mechanical structure of the accelerometer is packaged in vacuo in a tight casing.

As with many sensors, temperature variations are a source of limitation of the performance of vibrating beam accelerometers. In the case of vibrating beam accelerometers, temperature variations cause variations in the frequency of the beam which can be wrongly interpreted as being caused by an acceleration.

The mechanisms of action of temperature are of different natures, depending on whether the temperature variation is slow or rapid.

A slow temperature variation is to be understood as meaning that the rate of variation of the temperature is sufficiently low that the temperature is virtually uniform throughout the structure of the accelerometer.

During a slow temperature variation, there are primarily only two phenomena that occur.

The first phenomenon is the natural modification of the dimensional and mechanical parameters of the beam, which intrinsically causes a variation in its resonance frequency. The material of which the beam is composed plays a decisive role, and it is known, for example, in the clock- and watch-making industry that quartz allows the influence of temperature on the resonance frequency of a flexurally vibrating beam to be reduced significantly.

The second phenomenon is present when the accelerometer is produced from a plurality of materials, for example when the accelerometer comprises a beam made of quartz that is attached to a proof mass and a fixed part that are made of metal. Because the coefficients of thermal expansion of those materials cannot strictly be equal, the differential expansion causes an axial force of extension or compression on the beam, which modifies its resonance frequency by the same mechanism as acceleration, that is to say, unfortunately, with the same effectiveness. For that reason, it is advantageous for the structure of the accelerometer to be produced from a single material. Accordingly, it is known, for example, to produce monolithic quartz accelerometer structures, which allows this second phenomenon to be eliminated and the influence of slow temperature variations thus to be limited to the first phenomenon, that is to say to the natural variations of the resonance frequency of the beam.

However, for applications which require a high precision of measurement, for example inertial navigation, the amplitudes of these natural variations in the frequency of the beam are still too great and cannot sufficiently be compensated by a model based on knowledge of the temperature obtained by means of a conventional temperature sensor positioned close to the accelerometer.

The first approach described below employs, to that end, two substantially identical accelerometer structures which are very close to one another, generally contained within the same tight casing, and operate in differential mode, that is to say are arranged so that their sensitive axes are in opposite directions, as is described in U.S. Pat. No. 5,962,786 in the name of the applicant. In that manner, the two structures "see" accelerations Γ and −Γ, respectively, of opposite directions and are subject, on the other hand, to virtually the same temperature variation (T−T$_0$). Their respective frequencies F and F' are written, in simplified form:

$$F \approx K_0 + K_1 \cdot \Gamma + K_2 \cdot \Gamma^2 + \alpha_1 \cdot (T-T_0) + \alpha_2 \cdot (T-T_0)^2$$

$$F' \approx K_0 + K_1 \cdot (-\Gamma) + K_2 \cdot (-\Gamma)^2 + \alpha_1 \cdot (T-T_0) + \alpha_2 \cdot (T-T_0)^2$$

where, for each of the structures, K$_0$ is the frequency in the absence of acceleration and at the reference temperature T$_0$, K$_1$ and K$_2$ are the coefficients of sensitivity to the acceleration of first and second order, and α$_1$ and α$_2$ are the coefficients of sensitivity to the temperature of first and second order.

The output quantity S of such a differential accelerometer is the difference between the two frequencies F and F':

$$S \approx F - F' \approx 2 \cdot K_1 \cdot \Gamma$$

Accordingly, operation in differential mode on the one hand allows the response of the sensor to the acceleration to be linearised, and on the other hand allows the influence of the temperature almost to be eliminated. In practice, given the production imperfections, the sensitivity of the output S to the temperature is not zero but approximately two orders of magnitude smaller than that of each of the frequencies F and F', which is generally sufficient.

There have just been explained, in the case of slow temperature variations, mechanisms of action of the temperature on the precision of the accelerometer, and ways of remedying them.

There will now be discussed the case of rapid temperature variations, on the basis of the differential accelerometer DA that is the subject-matter of the above-mentioned patent and shown in FIG. 1.

The disadvantage of this first approach is that it is not able to solve the problem of the degradation of the precision of measurement of the sensor when the sensor is subject to rapid temperature variations, as is shown in the following.

Said differential accelerometer DA is composed of two monolithic quartz accelerometer structures TAe1 and TAe2 which are substantially identical. Each accelerometer structure has the general form of a disk and its sensitive axis is approximately perpendicular to the plane of the disk, the sensitive axes of the two structures being in opposite directions. In general, the diameter of the disk is less than 10 mm and its thickness is less than 1 mm. For each structure, the vibrating beam (3e1; 3e2) is integral at one end with a first solid part (2e1; 2e2) serving as the proof mass and at the other end with a second solid part (4e1; 4e2) serving as the fixed part with respect to the operation of the structure subjected to an acceleration. In general, the cross-sectional dimensions of the vibrating beam are less than 100 μm. Each of said solid parts is generally U-shaped. The frame (5e1; 5e2) surrounding the two solid parts is intended to preserve the quality of the flexural vibration of the beam but plays virtually no role with respect to the operation of the structure subjected to an acceleration.

This differential accelerometer known from the prior art belongs to the category of the electromechanical microsystems (MEMS) and has good performances as long as the temperature variations are relatively slow. For relatively rapid variations, on the other hand, for example 10° C./min, the precision of the accelerometer is substantially degraded. This is due mainly to the fact that a rapid temperature variation generally induces on the one hand a spatial temperature gradient inside the tight casing, more precisely a temperature difference between the two vibrating beams, and on the other hand a spatial temperature gradient within each accelerometer structure, as will be explained hereinbelow with reference to FIG. 2.

Figure 2:
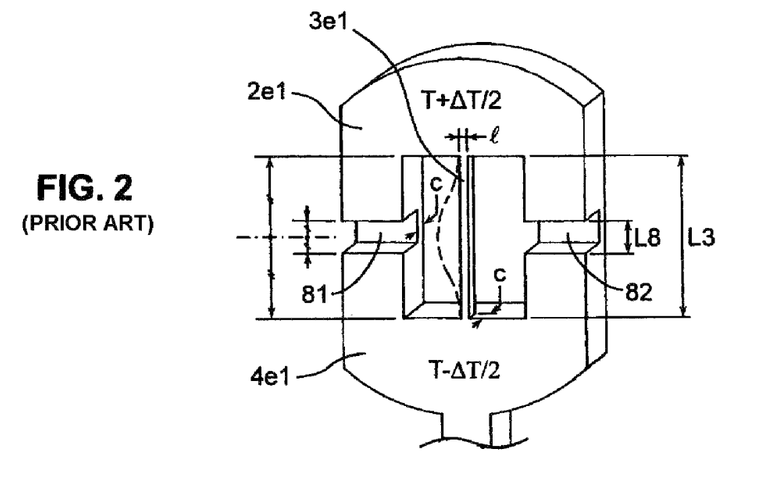
FIG. 2 is a partial view of one of the two structures of said differential sensor according to the prior art and already discussed.

FIG. 2 shows a partial view of one of the two structures (TAe1) of the accelerometer DA of FIG. 1, limited principally to the vibrating beam 3e1, to the solid parts 2e1 and 4e1, and to the articulations 81 and 82. It will be noted, as explained in the above-mentioned patent, that the structure can be produced in a single chemical machining step by simultaneously etching the two faces of a quartz wafer to a depth corresponding to the thickness c of the beam and of the articulations. This simplicity of production allows a low manufacturing cost to be obtained, all the more so since a plurality of structures can be machined simultaneously in a single wafer, for example about twenty structures in a wafer having surface dimensions of 38.1 mm×38.1 mm.

The flexural vibration of the beam takes place parallel to the plane of the structure, as is shown in an exaggeratedly enlarged manner by the dotted line in FIG. 2. This enables the frequency of vibration to have a relatively low dispersion over a production group, because the frequency of the flexural vibration of the beam depends greatly on its length (L3) and on its cross-sectional dimension taken in the vibration plane, in the present case its width l, those two dimensions being obtained by very precise photolithographic processes, while its other cross-sectional dimension, in the present case its thickness c obtained by stopping chemical machining, is less easy to control.

When the structure is subject to a temperature variation, the conduction of heat by the solid part 4e1 to the solid part 2e1 takes place solely through the vibrating beam and the articulations, that is to say through the thin portions, which behave like a brake with respect to the conduction of heat. Under such conditions, it is known that the temperature of each of the solid parts is substantially uniform and that the difference ΔT between the temperatures of the two solid parts is proportional to the rate of temperature variation.

For each of the thin portions, of parallelepipedal shape, the conventional equations of heat conduction show that the temperature varies substantially linearly between its ends integral with the solid parts. The vibrating beam 3e1 and the articulations 81 and 82 therefore have the same mean temperature T, T being the temperature at the middle of their length. Accordingly, the temperature of the vibrating beam and of the articulations varies linearly between T−ΔT/2 and T+ΔT/2.

The length of the articulations 81 and 82 will be called L8, and it will be noted that the position of the articulations is in line with the middle of the length L3 of the vibrating beam. Under those conditions, the length dimension of each of the parallel limbs of the U-shaped solid parts 2e1 and 4e1 is (L3−L8)/2.

With the aid of a one-dimensional model parallel to the longitudinal axis of the vibrating beam, it is now possible to express the impact of the spatial temperature gradient on the expansions of the two paths of material joining each of the two ends of the vibrating beam, the first path passing through said beam and the second path passing through the articulations. With "a" denoting the coefficient of thermal expansion of the material:

Expansion of the First Path:

$$a \cdot T \cdot L3$$

Expansion of the Second Path:

$$a \cdot (T-\Delta T/2) \cdot (L3-L8)/2 + a \cdot T \cdot L8 + a \cdot (T+\Delta/2)(L3-L8)/2 = a \cdot T \cdot L3$$

After simplification in the second equation it will be seen that the expansions of the two paths are theoretically identical and that no axial force of expansion or compression is thus theoretically exerted on the vibrating beam. That would not be the case if the articulations were not situated in line with the middle of the length L3 of the vibrating beam, because the expansions of the two paths of material would not be balanced and there would result an axial force of extension or compression responsible for a variation in the frequency of the vibrating beam, said frequency variation being proportional to $\Delta T$ and therefore proportional to the rate of temperature variation $\delta T/\delta t$.

In practice, it is difficult to obtain this balance, which makes high demands on production tolerances. Accordingly, each of the two structures constituting the differential accelerometer has a sensitivity to $\delta T/\delta t$. When the two structures are produced in the same batch, typically by collective chemical machining from a single quartz wafer, the sensitivities to $\delta T/\delta t$ can be relatively similar, which would lead to the hope of a reduction in the sensitivity of the differential output S. In reality, that reduction can be obtained only if the two vibrating beams "see" precisely the same rate of temperature variation $\delta T/\delta t$, which is generally not the case. Accordingly, the frequencies F and F' delivered by the two structures are written, in simplified form:

$$F \approx K_0 + K_1 \cdot \Gamma + K_2 \cdot \Gamma^2 + \alpha_1 \cdot (T-T_0) + \alpha_2 \cdot (T-T_0)^2 + \lambda \cdot \delta T/\delta t$$

$$F' \approx K_0 + K_1 \cdot (-\Gamma) + K_2 \cdot (-\Gamma)^2 + \alpha_1 \cdot (T'-T_0) + \alpha_2 \cdot (T'-T_0)^2 + \lambda' \cdot \delta T/\delta t$$

where T and T' are the mean temperatures of the two vibrating beams, and $\lambda$ and $\lambda'$ are the coefficients of sensitivity of the two frequencies to the rate of temperature variation.

The reader will have noted that, in the presence of rapid temperature variations, the frequency of each of the vibrating beams is associated with the temperature by two very different phenomena: the first involves the instantaneous mean temperature of the beam and is related to the phenomenon of the natural modification of the dimensional and mechanical parameters of the beam in the case explained above of slow temperature variations, and the second phenomenon involves the rate of temperature variation which induces an axial force of extension or compression on the beam. In addition, the mean temperatures of the two beams are not identical, like their rates of variation.

Under those conditions, it is difficult in practice to take advantage of operation in differential mode, unless a sufficiently high-performance casing were produced and assemblies of the two structures in the casing sufficiently identical to obtain, with sufficient identity, $T \approx T'$ and $\delta T/\delta t \approx \delta T'/\delta t$ were produced. However, such a casing and such assemblies would lead to an excessive production cost in comparison with the low cost of producing structures made of quartz.

The second approach is described in the article entitled "Precision gravity measurement utilizing Accelerex vibrating beam accelerometer technology" by Brian L. Norling (IEEE PLANS 1990), in which there is shown an additional vibrating element (a flexurally vibrating quartz beam), integral with the inside wall of the tight casing, and which is intended solely to provide temperature information in frequency form. Said temperature information is used to compensate, by a model, the effects of the temperature on the output signal, which is also frequential, of the vibrating beam accelerometer.

This compensation is very effective for very slow temperature variations, as is indicated in the article, which recommends protecting the accelerometer from transient temperature states.

The disadvantage of this second approach is that, as for the first approach, it does not allow the problem presented by rapid temperature variations to be solved. In the case of the second approach, the rapid temperature variations induce a relatively great spatial temperature gradient inside the tight casing, and in particular a temperature difference between the additional vibrating element and the vibrating beam of the accelerometer structure. Accordingly, the temperature indication provided by the additional vibrating element is not sufficiently representative of the temperature of the vibrating beam of the accelerometer structure.

The third approach is described in the article entitled "Dual-mode temperature compensation for a comb-driven MEMS resonant strain gauge" by Robert G. Azevedo (Sensors and Actuators A: Physical 2008), in which there is shown a sensitive sensor element, said sensitive element comprising a single resonator composed of a tuning fork having two substantially identical beams (double-ended tuning fork, DETF). The tuning fork can be seen as replacing the single beam 3e1 of the first approach illustrated in FIG. 2.

Said sensitive element further comprises two substantially identical solid parts, which are of a size larger than that of the tuning fork and are arranged on either side of the tuning fork. Each solid part is fixed to a beam by a flexible portion in the vicinity of the middle of the length of the beam, and its role is that of a comb-drive actuator, permitting high effectiveness of the actuation.

The device is capable of vibrating according to two particular modes. For the first particular mode, the two beams vibrate torsionally in antiphase relative to one another (mode A at 86.1 KHz) and for the second particular mode, the two beams vibrate flexurally in antiphase relative to one another (mode D at 218 KHz). For each of the two modes, the two solid parts mainly play an inertia role (rotational inertia for the first mode and translational inertia for the second mode). Accordingly, the zone of fixing of each solid part to the vibrating beam corresponds to a vibration antinode, more precisely a torsional vibration antinode for the first mode and a flexural vibration antinode for the second mode.

The two modes are each sensitive to the input quantity to be measured (for example a force or an acceleration) and to the temperature, the important fact being that the coefficients of those sensitivities are not in the same ratio for the two modes, which, by observing the variations of their frequencies, allows the input quantity and the temperature to be discerned, for example by solving a system of two equations with two unknowns.

This third approach is very effective for very slow temperature variations.

The disadvantage of this third approach is that, as for the first and second approaches, it does not allow the problem presented by rapid temperature variations to be solved. In the case of the third approach, the two modes, when subjected to a rapid temperature variation, would see their frequencies vary as a function of three parameters: the input quantity to be measured, the temperature T, and the rate of temperature variation $\delta T/\delta t$, as explained above for the first approach. It would therefore not be possible, by observing the variations in the frequencies of the two modes, to discern those three parameters, since this would be equivalent to wishing to solve a system of two equations with three unknowns.

It may nevertheless be interesting to take inspiration from this third approach and try to involve another mode of vibration of the device that is not sensitive to the axial forces of extension or compression applied to the tuning fork. Accordingly, this other mode of vibration would not be sensitive either to the input quantity to be measured or to the rate of temperature variation $\delta T/\delta t$ as explained above, but would be sensitive only to the temperature T. It would then be possible, by measuring the frequency of that other mode of vibration, to know T and, by means of two successive measurements of said frequency, to determine a "discrete partial derivative" almost equal to $\delta T/\delta t$. Knowledge of those two parameters, associated with the measurement of the frequency, for example, of mode D, which depends on the input quantity, on T and on $\delta T/\delta t$, would allow the input quantity to be determined.

Unfortunately, the configuration of the device according to the third approach does not permit the existence of such another mode of vibration, as is possible to understand from the article in view of the illustrations showing eight modes of vibration of the device. The dissymmetry created by the fixing of each solid part on one side of the beam is responsible for the fact that the zone of said fixing is a translational or rotational antinode of the beam, whatever the mode of vibration of the device. Accordingly, the frequency of the mode of vibration is sensitive to the axial forces of extension or compression applied to the tuning fork, that is to say sensitive to the input quantity to be measured and to $\delta T/\delta t$.

SUMMARY

The object of the invention is especially to overcome the disadvantages of the previous approaches by proposing an inexpensive device which provides a very precise measurement of the temperature of the vibrating beam, which allows the sensitivity of any vibrating beam sensor structure to temperature and the rate of variation thereof to be compensated effectively by a model.

To that end, the device for measuring the temperature of the beam, which vibrates according to a flexural mode, of a vibrating beam sensor, comprising an additional element which vibrates according to a different mode and the resonance frequency of which, as a function of the temperature, is known, said resonance frequency being substantially different from that of the beam, is characterised in that said element is a resonator vibrating torsionally in resonance mode and having a torsional vibration node, said node being its zone of fixing in the vicinity of the middle of the length of the vibrating beam, said fixing permitting heat transfer between the resonator and the beam, by virtue of which the frequency of the resonator and the variations of that frequency are representative of the mean temperature T of the beam and of the variations of that temperature T, respectively.

The fact that the resonator is held in the region of a node of its torsional vibration means that its frequency is not very sensitive to an axial force of extension or compression induced on the beam by the input quantity that is to be measured by the sensor, that is to say is not very sensitive to said input quantity. The torsional vibration of the resonator, on the other hand, is very sensitive to the temperature, in the present case to the temperature of the middle of the beam, and therefore to the mean temperature of the beam.

Preferably, the frequency of the torsionally vibrating resonator is markedly different from that of the flexurally vibrating beam, so that the two vibrations are able to coexist virtually without interfering with one another.

According to a second particular embodiment, the device of the invention is characterised in that the resonator has the general shape of an H, the two parallel limbs of which are two substantially identical solid parts arranged parallel to the longitudinal axis of the beam and on either side of the beam, and the common limb of which is constituted by two substantially identical portions which are integral with the beam and capable of torsional deformation.

According to a third particular embodiment, the resonator and the beam form a planar monolithic structure of uniform thickness, in order to retain the possibility of producing the vibrating beam sensor structure in a single chemical machining step, which is favourable to the production of a sensor of the MEMS type and allows a low manufacturing cost to be obtained.

According to a fourth particular embodiment, the device of the invention according to one of the preceding embodiments is characterised in that the resonator is equipped with vibration-inducing means which are connected to an oscillating electronic loop allowing the torsional vibration of the resonator in resonance mode to be maintained.

According to a fifth particular embodiment, the device of the invention according to the fourth embodiment is characterised in that the resonator and the beam are made of piezoelectric crystal, for example of quartz, and in that the vibration-inducing means of the resonator are in the form of electrodes carried by the torsionally controlled portions of the resonator.

According to a sixth particular embodiment, the device of the invention according to the fifth embodiment is characterised in that, in the case where the vibration-inducing means of the beam are in the form of electrodes supported by the beam and connected to another oscillating electronic loop allowing the flexural vibration of the beam in resonance mode to be maintained, the electrodes of the resonator are electrically independent of the electrodes of the beam, which allows the oscillating electronic loops of the resonator and of the beam to work independently of one another.

According to a seventh particular embodiment, the device of the invention according to the fifth embodiment is characterised in that, in the case where the vibration-inducing means of the beam are in the form of electrodes supported by the beam and connected to another oscillating electronic loop allowing the flexural vibration of the beam in resonance mode to be maintained, the electrodes of the resonator and of the beam are electrically connected to one another, which allows the beam to be excited over its entire length.

According to an eighth particular embodiment, the device of the invention according to one of the preceding embodiments is characterised in that it is used to improve the precision of measurement of a vibrating beam sensor by compensating, by a model, the effects of temperature on the frequency of the vibrating beam.

In order that the resonator can improve significantly the precision of measurement of the sensor in the case of rapid temperature variations, it is possible to use for each sensor structure a compensation model based not only on the mean temperature of the beam but also on the rate of variation of that temperature.

According to a ninth particular embodiment, the device of the invention according to the eighth embodiment is characterised in that said vibrating beam sensor is a sensor of the MEMS type.

The invention relates also, in another aspect, to a method of using a device for measuring the temperature of the flexurally vibrating beam of a vibrating beam sensor, comprising the following steps:

Step E1: positioning a vibrating element operating in resonance mode by virtue of an oscillating electronic circuit, the resonance frequency of which as a function of the temperature is known, in such a manner that its temperature is representative of the mean temperature T of the vibrating beam;

Step E2: measuring the frequency of vibration $F_R$ of the vibrating element; and Step E3: evaluating the mean temperature T of the vibrating beam on the basis of the measurement of the frequency of vibration $F_R$ of said vibrating element;

and characterised in that:

the positioning of said vibrating element, which vibrates torsionally at a resonance frequency substantially different from that of the beam and has a torsional vibration node, is carried out in such a manner that said element is fixed, in the region of said node, directly to the beam, in the vicinity of the middle of its length, said fixing permitting heat transfers between the vibrating element and said beam, by virtue of which the temperature of said element and the variations, even rapid variations, of that temperature are very substantially equal to the mean temperature T of said beam and to the variations, even rapid variations, of that temperature T, respectively;

said method further comprises the following steps:

Step E4: evaluating, on the basis of at least two successive measurements of the torsional vibration frequency $F_R$ of the vibrating element, the variation over time of said frequency $F_R$;

Step E5: evaluating the variation over time of the mean temperature of the vibrating beam, on the basis of the evaluation of the variation over time of said frequency $F_R$.

According to a second method of using the device of the invention, the method can further comprise the following steps:

Step E0: measuring the frequency F of the vibrating beam;

Step E6: evaluating the input quantity to be measured by the sensor by compensating, by a model, the effects of the temperature and its variation on the operation of said sensor, so as to obtain a more precise evaluation of that input quantity, said compensation being made on the basis on the one hand of the evaluations of the mean temperature T of the vibrating beam, the evaluation of its variation over time, the measurement of the frequency F of vibration of the beam, and on the other hand of a model expressing said frequency F as a function of said input quantity, of the temperature T and of the variation over time of T.

According to a third method of using the device of the invention, the method according to the second use method is characterised in that the measurement of the frequency $F_R$ of the vibrating element (step E2) is carried out simultaneously with the measurement of the frequency F of the beam (step E0).

According to a fourth method of using the device of the invention, the method according to the second or third use method is characterised in that, in the case where said vibrating beam sensor is a differential sensor comprising two vibrating beams each equipped with a device for measuring the temperature according to the invention, said method is used to compensate the effects of the temperature on the frequency of each of the beams.

BRIEF DESCRIPTION OF THE DRAWINGS

The features and advantages of the invention will become more clearly apparent upon reading the detailed description and the figures relating thereto, in which.

DETAILED DESCRIPTION

Figure 3A:
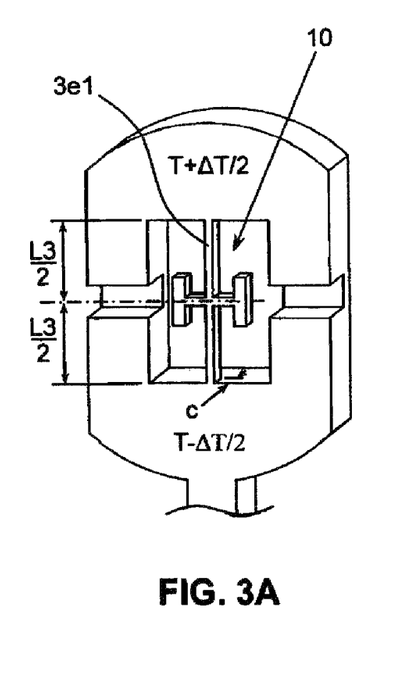
FIG. 3A is a view analogous to FIG. 2, to which there has been added, on the beam, the resonator of a device for measuring temperature according to the invention.
Figure 3B:
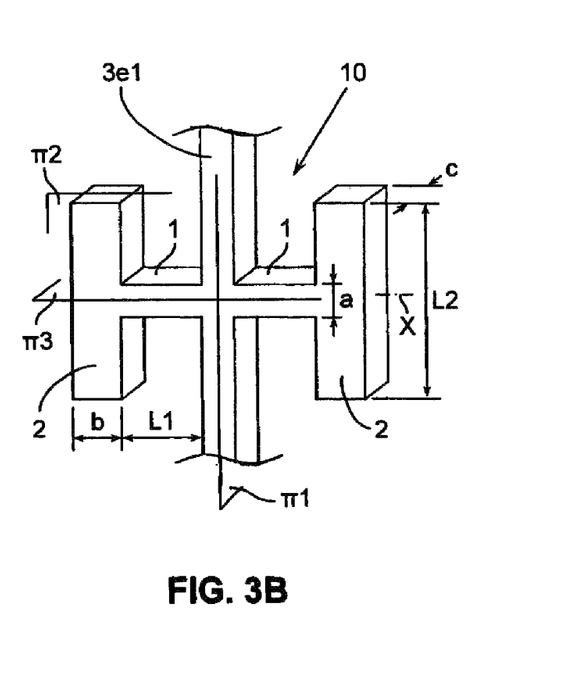
FIG. 3B is a an enlarged partial view of FIG. 3A, showing more precisely said resonator.

Reference will first be made to FIG. 3A, which shows a view analogous to that of FIG. 2 to which there has been added on the beam 3e1 the resonator 10 of a device for measuring temperature according to the invention. FIG. 3B is an enlarged partial view of FIG. 3A. The resonator 10 has the general shape of an H, the two parallel limbs of which are two substantially identical, parallelepipedal solid parts 2 of length L2 and width b, which are arranged parallel to the longitudinal axis of the beam and on either side of the beam, and the common limb of which is constituted principally by two substantially identical, parallelepipedal portions 1 of length L1 and width a, which are integral with the beam in the vicinity of the middle of its length L3. The two portions 1 are capable of torsional deformation about their longitudinal central axis X, which is perpendicular to the longitudinal axis of the beam.

According to the illustrated representations, one of the two main faces of the resonator is coplanar with the face of the beam that faces towards the outside of the structure of the sensor, and the other main face of the resonator is coplanar with the face of the beam that faces inwards. The resonator 10 and the beam 3e1 thus form a planar monolithic structure of uniform thickness c, which allows the possibility of producing the structure of the sensor in a single chemical machining step to be retained, which is favourable to the production of sensor of the MEMS type. Compared with the prior art illustrated in FIGS. 1 and 2, the only difference regarding production is the geometry of the photolithographic mask corresponding to the face of the wafer where the beam appears, said photolithographic mask including the front pattern of the resonator. Otherwise, the implementation of the chemical machining is unchanged.

According to the illustrated representations, said planar monolithic structure of uniform thickness c has three orthogonal planes of symmetry $\pi 1, \pi 2, \pi 3$, and therefore one centre of symmetry. With regard to the structures produced in the present invention, chemical machining does not allow rigorous control of the shapes of the various constituent elements. The person skilled in the art will appreciate that this lack of precision must be taken into account when interpreting some descriptive terms, such as, for example, the symmetries of the structure or the dimensions of the elements.

There will now be explained, with reference to FIGS. 4A and 4B, the two modes of mechanical vibration that occur simultaneously in the operation of a vibrating beam sensor equipped with the resonator of a device according to the invention. It is important to note that each of the two modes of vibration works at its resonance frequency, and that the resonance frequencies of the two modes are markedly different from one another, so that the two vibrations are able to coexist virtually without interfering with one another.

Figure 4A:
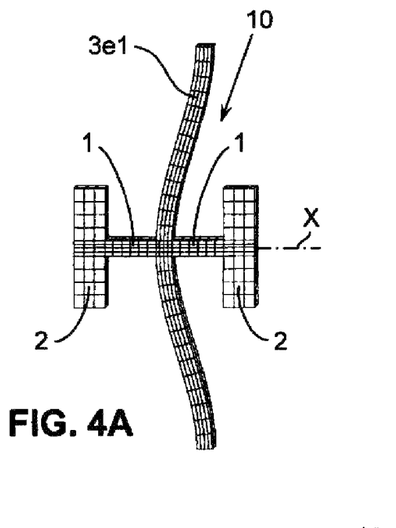
FIG. 4A shows exaggeratedly enlarged deformations of the flexurally vibrating beam.

FIG. 4A shows, for the first mode, exaggeratedly enlarged vibrations of the beam 3e1 vibrating flexurally in resonance mode, when the resonator 10 is not vibrating torsionally. It will be seen that the resonator 10 behaves like a virtually non-deformed moving element which undergoes an alternative translation parallel to the longitudinal axis X of the portions 1 and the amplitude of which is that of the deformation antinode of the beam. This first mode must be seen as replacing the vibration of the beam 3e1 of the prior art illustrated in FIG. 2, because the input quantity to be measured, in the present case an acceleration, acts on the resonance frequency of the first mode according to the same principle as that discussed in the preamble. In the case of an accelerometer, this first mode is called "accelerometer mode".

Compared with said prior art, the presence of the resonator 10 modifies the vibration resonance frequency of the beam and also modifies the sensitivity of that frequency to the axial force of extension or compression induced on the beam by the input quantity to be measured. However, the orders of magnitude of those parameters are not changed and it is possible, by modifying the dimensions of the beam, to get close to the initial values. These modifications can be made, for example, by means of analytical simulations or numerical simulations based on the finite element method.

Figure 4B:
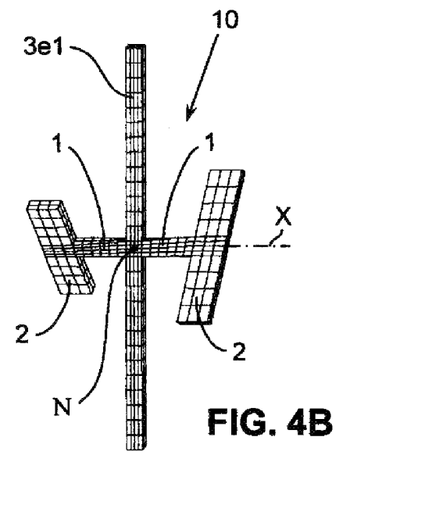
FIG. 4B shows exaggeratedly enlarged deformations of the torsionally vibrating resonator.

FIG. 4B shows, for the second mode, exaggeratedly enlarged deformations of the resonator 10 vibrating torsionally in resonance mode, when the beam 3e1 is not working flexurally. More precisely, the two portions 1 work torsionally about their longitudinal axis X and the two solid parts 2, which are virtually not deformed, undergo alternative rotations about the axis X in antiphase relative to one another. Accordingly, the moments exerted by the two portions 1 on the beam 3e1 balance out in the zone where the resonator is integral with the beam, and the resonator 10 accordingly has a torsional vibration node N situated in said zone.

The fact that the resonator is held in the region of a node of its torsional vibration means that its resonance frequency is not very sensitive to an axial force of extension or compression induced on the beam by the input quantity to be measured, that is to say is not very sensitive to said input quantity. The torsional vibration of the resonator, on the other hand, is very sensitive to its temperature, in the present case to the temperature of the middle of the beam, and therefore to the mean temperature of the beam. This second mode is called "thermometric mode".

As already stated above, the first and second modes occur in parallel in the operation of a vibrating beam sensor equipped with the resonator of a device according to the invention. In other words, the vibrations of the two modes are superposed, each of the modes vibrating at its resonance frequency. In order that said vibrations are virtually independent of one another and accordingly that their functions, namely measurement of the input quantity of the sensor and thermometric measurement, respectively, are dissociated, it is important that the resonance frequencies of the two modes are markedly different. This allows there to be virtually no mechanical coupling between the two vibrations despite imperfect control of the machining of the beam and of the resonator. By way of example, the frequency of the first mode is approximately 60 kHz and that of the second mode approximately 150 kHz.

Figure 1:
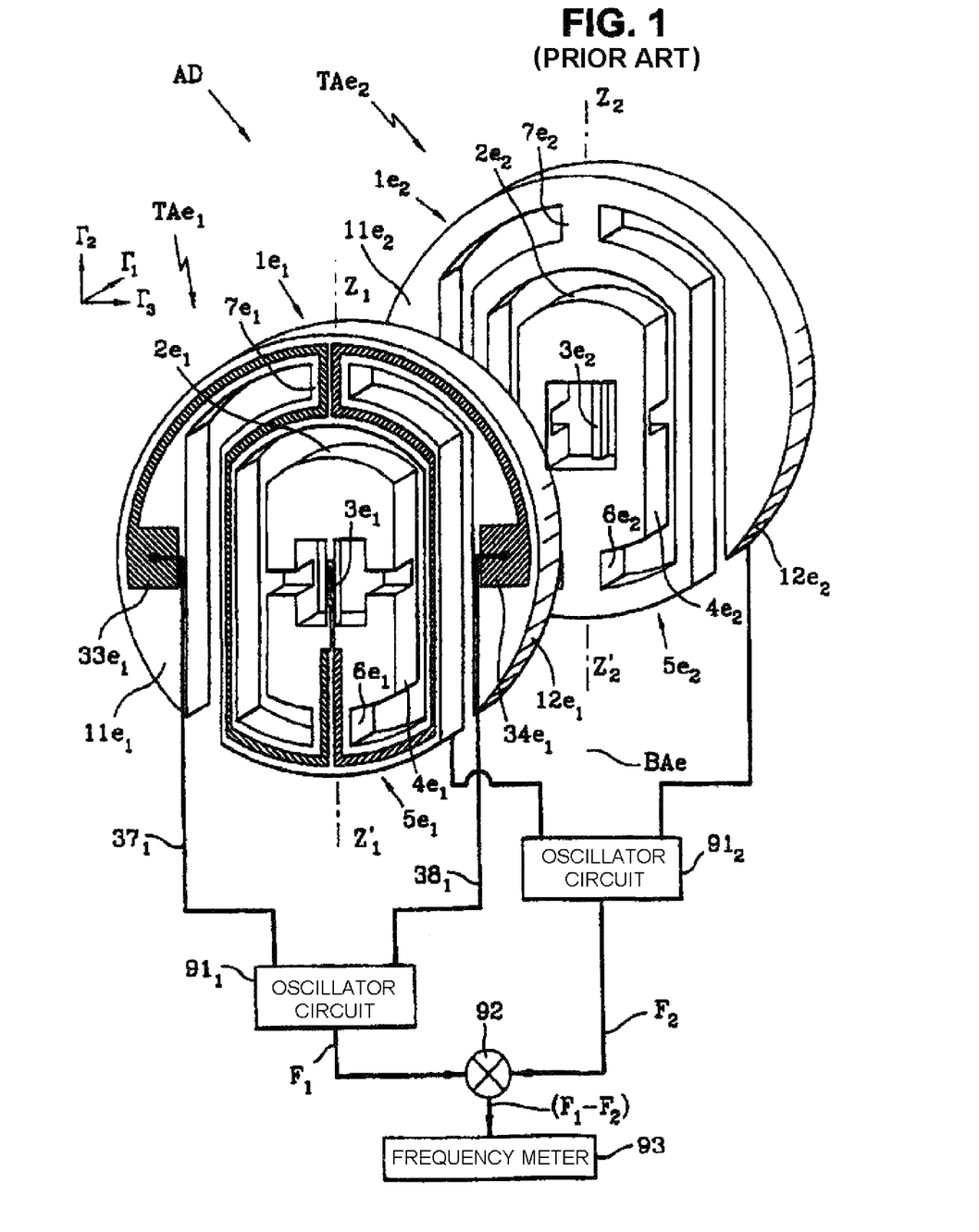
FIG. 1 shows a differential sensor measuring acceleration according to the prior art and already discussed.

The resonator and the beam are equipped with vibration-inducing means, for example in the form of adherent metal electrodes, as is the case in the prior art shown in FIG. 1.

In particular, the resonator is equipped with vibration-inducing means connected to an oscillating electronic loop, allowing the torsional vibration of the resonator in resonance mode to be maintained.

The resonator and the beam are made of piezoelectric crystal, for example of quartz, and the vibration-inducing means of the resonator are in the form of electrodes carried by the portions 1 of the resonator.

Figure 5A:
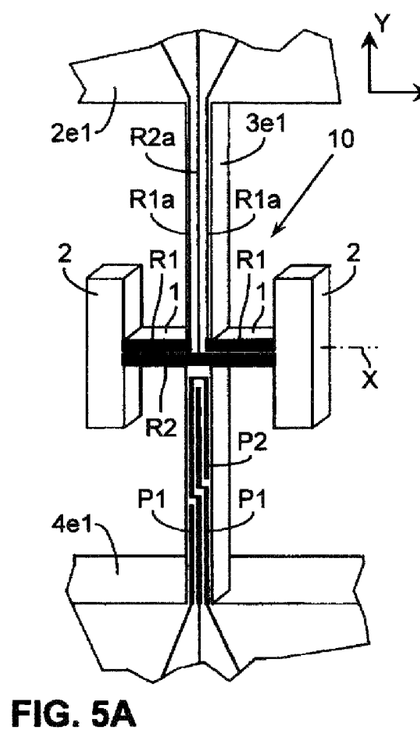
FIGS. 5A and 5B each show means for inducing flexural vibration of the beam and torsional vibration of the resonator.
Figure 5B:
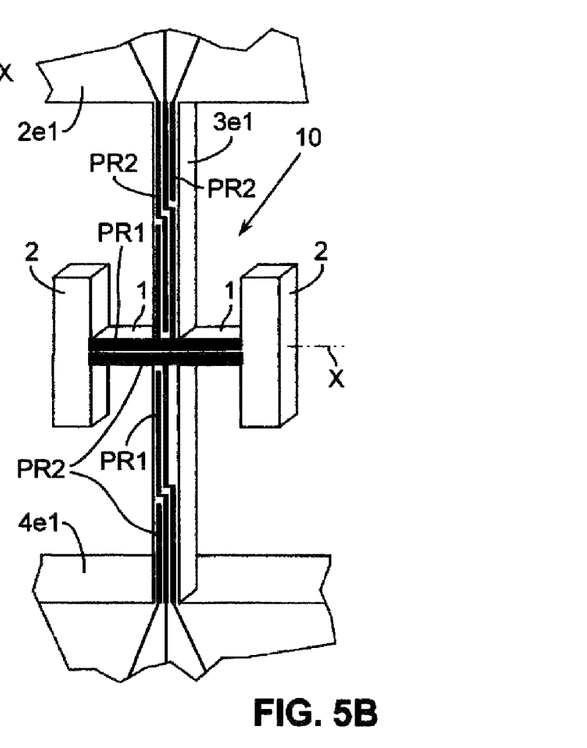

FIGS. 5A and 5B show two embodiment examples of electrodes according to the invention, for which the electrodes are arranged on the faces, facing the outside of the structure of the sensor, of the resonator and of the beam. Accordingly, it is possible, unlike in said prior art, to produce the electrodes at low cost by etching the metal layer previously used as the mask for the chemical machining of the structure of the sensor.

For the first embodiment example shown in FIG. 5A, the electrodes of the resonator 10 are independent of the electrodes of the beam 3e1. The electrodes R1 and R2 of the resonator are in the form of ribbons extending on the portions 1 parallel to their longitudinal axis X, which is also the electric crystallographic axis X of the quartz in the embodiment shown, the mechanical crystallographic axis Y being oriented parallel to the longitudinal axis of the beam. The electrodes R1 and R2 are capable of creating in the portions 1, in the vicinity of the face carrying the electrodes, an electric field the component $E_Y$ of which parallel to the mechanical crystallographic axis Y is coupled by the piezoelectric effect to the mechanical shear constraint $T_{XY}$ occurring in a preponderant manner in the torsion of the portions 1. Accordingly, the electrodes R1 and R2 are effective means for inducing vibration of the second mode shown in FIG. 4B. The electrodes R1 and R2 are connected to ranges of electrical connections (not shown) by means of straight connecting tapes R1a and R2a passing through the half of the length of the beam integral with the proof mass 2e1.

Referring still to FIG. 5A, the electrodes P1 and P2 of the beam 3e1 are carried by the other half of the length of the beam and are of the so-called "three-track" type known to the person skilled in the art, which allows the electric fields $+E_X$ and $-E_X$ to be generated simultaneously in the vicinity of the stretched and compressed, respectively, longitudinal fibres of the beam working flexurally. It will be noted that the configuration of the electrodes P1 and P2 allows said electric fields $+E_X$ and $-E_X$ to change sign substantially at a quarter of the length of the beam, in order to correspond to the inversion of the curvature of the beam visible in FIG. 4A. The electrodes P1 and P2 are connected to ranges of electrical connections (not shown) different from those of the electrodes R1 and R2. Accordingly, the electrodes P1 and P2 of the beam 3e1 are electrically independent of the electrodes R1 and R2 of the resonator 10.

In addition, the electrodes P1 and P2 of the beam 3e1 are not capable of exciting the vibration of the resonator 10, and the electrodes R1 and R2 of the resonator 10 are not capable of exciting the flexural deformation of the beam 3e1. With regard to the connecting ribbons R1a and R2a of the electrodes R1 and R2 carried by half the length of the beam and which may be viewed as electrodes of the "three-track" type, their straight configuration renders them virtually incapable of exciting the flexural deformation of the beam because that configuration does not correspond to the inversion of the curvature of the beam at a quarter of its length. Accordingly, the electrodes P1 and P2 are selective for the flexural deformation of the beam, that is to say selective for the first vibration mode illustrated in FIG. 4A, and the electrodes R1 and R2 of the resonator are selective for the second vibration mode illustrated in FIG. 4B.

Under those conditions, it is not particularly difficult to operate a first oscillating electronic loop connected to the electrodes P1 and P2 and, independently, a second oscillating electronic loop connected to the electrodes R1 and R2, the frequencies of the signals circulating in said loops being representative of information relating to the input quantity measured by the sensor and the temperature, respectively. This allows the oscillating electronic loops of the resonator and of the beam to work independently of one another.

As a counterpart to this ease of implementation, the electrodes of the beam are arranged only over half of its length, which does not allow the maximum piezoelectric coupling between the mechanical vibration of the first mode and the associated oscillating electronic loop to be reached. It follows that the first mode has, in resonance vibration, a relatively high equivalent electrical resistance, which can in some cases be detrimental to the measurement resolution of the sensor. It is then possible to use the second embodiment example illustrated in FIG. 5B.

For the second embodiment example illustrated in FIG. 5B, the electrodes of the resonator 10 are not independent of the electrodes of the beam 3e1. More precisely, the electrodes of the resonator and of the beam are intimately electrically connected, which justifies their common references PR1 and PR2 in the figure. The electrodes PR1 and PR2 combine on the one hand electrodes in the form of ribbons carried by the portions 1 of the resonator, and on the other hand electrodes of the "three-track" type carried by the beam over the whole of its length. The electrodes PR1 and PR2 are connected to ranges of electrical connections (not shown) which are common to the first and second vibration modes, said common ranges of connections being connected to two oscillating electronic loops (not shown) arranged in parallel.

It will be seen in the figure that the electrodes carried by the beam, in addition to their vibration-inducing function of the first mode, act as the connecting tapes R1a and R2a shown in FIG. 5A.

The reader will appreciate that the second embodiment example has, relative to the first example, the advantage of greater piezoelectric coupling as far as the first vibration mode is concerned (excitation over the entire length of the beam), and the disadvantage of a lack of selectivity of the electrodes in respect of the two modes. It is possible to overcome this disadvantage by arranging in the region of each of the two oscillating electronic loops a sufficiently selective electronic filtering circuit centred on the frequency of the corresponding mode, namely 60 kHz for the first mode and 150 kHz for the second mode in the above-mentioned example. However, by nature, an electronic filtering circuit induces phase instability of the signal, especially in the case of temperature variations, but that phase instability is smaller, the higher the quality coefficient of the vibration of the mode.

In conclusion, the choice between the two embodiment examples shown in FIGS. 5A and 5B does not have to be made a priori, but certain parameters concerning the sensor and its field of use have to be taken into consideration.

There will now be explained, with reference to FIG. 3B, that the precision of the temperature measurement delivered by the resonator 10 is closely dependent on its dimensions L1, L2, a and b and on the thermal diffusivity of the material, in the present case in the example, quartz. These parameters govern the "warming up" of the resonator, and it is a priori easy to appreciate that the smaller the resonator, the more uniform the temperature distribution in the resonator, and therefore the more the indication provided by the frequency of the resonator is representative of the temperature of the middle of the beam.

The conventional equations of heat conduction allow the temperature gradient in the resonator to be translated, expressing the difference $\epsilon$ in temperature between the middle of the beam and each of the ends of the solid parts 2 of the resonator:

$$\epsilon \approx (L1^2/(2\cdot\kappa))\cdot(1+2\cdot b\cdot L2/(a\cdot L1)+L2^2/(4\cdot L1^2))\cdot\delta T/\delta t$$

where $\kappa$ is the coefficient of thermal diffusivity of the material and T is the temperature of the middle of the beam, to use the notation employed above.

By way of example, if a=b; L1=L2=0.1 mm $\kappa=3.5\cdot 10^{-6}$ m$^2$/s (quartz) and $\delta T/\delta t=10°$ C./min, then the difference $\epsilon$ in temperature in the resonator is of the order of $10^{-3}$° C.

This value of $10^{-3}$° C. is sufficiently low that, in practice, the temperature of the resonator reflects the temperature T of the middle of the beam with sufficient precision, and that the rate of variation of the temperature of the resonator reflects the rate of variation $\delta T/\delta t$ of the temperature of the middle of the beam with sufficient precision.

Calibration of the frequency $F_R$ of the resonator as a function of the temperature T having been carried out beforehand, the temperature T of the middle of the beam is derived from each acquisition of the frequency $F_R$ of the resonator, and its rate of variation $\delta T/\delta t$ is derived from the frequency increment between two successive acquisitions, as is explained with reference to FIG. 6, which illustrates the method of using a device according to the invention.

Figure 6:
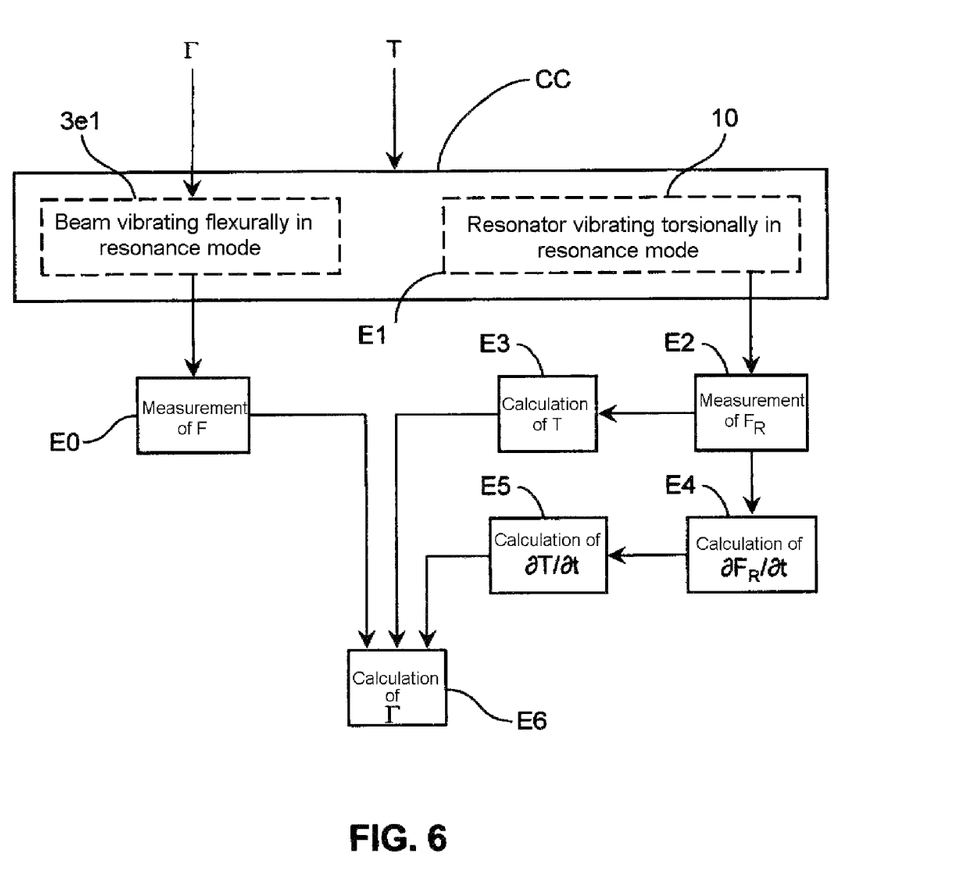
FIG. 6 illustrates the method of using the device according to the invention.

In FIG. 6, the box in dotted lines referenced 3e1 symbolises the vibrating beam of a sensor structure, and the box in dotted lines referenced 10 symbolises the resonator of a device according to the invention, said boxes in dotted lines being contained with the box CC symbolising a sensor with temperature compensation by virtue of the use of the device according to the invention.

The temperature acts on the whole of the sensor CC. By virtue of the positioning of the device of the invention directly on the vibrating beam (step E1), the temperature T of the resonator 10 is substantially equal to the temperature of the middle of the beam 3e1 and therefore to the mean temperature of the beam, as has been explained hereinbefore.

By contrast, the input quantity, in the present case the acceleration $\Gamma$, acts on the beam 3e1 but scarcely acts on the resonator 10, as has been explained hereinbefore.

In a preferred method of using the device according to the invention, the acquisition of the frequency $F_R$ of the resonator (step E2) is carried out simultaneously with the acquisition of the frequency F of the vibrating beam of each sensor structure (step E0), at a rate of, for example, 100 Hz.

The temperature T is calculated directly from the frequency $F_R$ (step E3), while the calculation of its rate of variation $\delta T/\delta t$ (step E5) requires two successive acquisitions of the frequency $F_R$ which allow a "discrete partial derivative" of $F_R$ relative to the time to be calculated, said discrete partial derivative in practice being almost equal to the rate of variation $\delta F_R/\delta T$ (step E4).

The values of T and $\delta T/\delta t$ so calculated and the measured value of F are introduced into the expression of the analytical model of F explained in the preamble:

$$F \approx K_0 + K_1 \cdot \delta + K_2 \cdot \Gamma^2 + \alpha_1 \cdot (T-T_0) + \alpha_2 \cdot (T-T_0)^2 + \lambda \cdot \delta T/\delta t$$

This thus permits calculation (step E6) of a value of the input quantity of the sensor (namely the acceleration $\Gamma$ in the example) very close to the true value, since the effects of the temperature variations on the frequency of the beam have been almost compensated.

The device according to the invention would also make it possible to envisage, if necessary, improving the effectiveness of this compensation further by using a model that also takes account of higher-order partial derivatives of the temperature relative to time ($\delta^2 T/dt^2$, etc.).

In the case of a differential sensor it is necessary, in order to make best use of the invention, that each of the two vibrating beams is provided with a device according to the invention, and that the compensation for the effects of the temperature is carried out for each of the beams according to the use method just described. The method is then used to compensate the effects of the temperature on the frequency of each of the beams.

In other respects, the value of operating the sensor in differential mode remains, but for aspects other than the temperature, for example in order to linearise the response of the sensor to the input quantity to be measured.

The invention claimed is:

1. A device for measuring the temperature of a beam of a vibrating beam sensor vibrating according to a flexural mode, the device comprising an additional element that vibrates according to a mode different from the flexural mode and the resonance frequency of which, as a function of the temperature, is known, said resonance frequency being substantially different from that of the beam, wherein the additional element is a resonator configured to vibrate torsionally in a resonance mode and having a torsional vibration node, said node being located in a fixing zone in the vicinity of a middle of a length of the vibrating beam, said fixing allowing heat transfers between the resonator and the beam, by virtue of which the frequency of the resonator and the variations in that frequency are representative of the mean temperature of the beam and of the variations in that temperature, respectively.

2. The device according to claim 1, wherein the resonator has the general shape of an H, two parallel limbs of which are two substantially identical solid parts arranged parallel to the longitudinal axis of the beam and on either side of the beam, and a common limb of which is constituted by two substantially identical portions integral with the beam and capable of torsional deformation.

3. The device according to claim 1, wherein the resonator and the beam are configured to form a planar monolithic structure of uniform thickness.

4. The device according to claim 1, wherein the device is able to improve the precision of measurement of a vibrating beam sensor by compensating, by a model, the effects of temperature on the frequency of the vibrating beam.

5. The device according to claim 4, wherein said vibrating beam sensor is a sensor of the MEMS type.

6. The device according to claim 1, wherein the resonator is equipped with a vibration inducer connected to an oscillating electronic loop configured to allow the torsional vibration of the resonator in resonance mode to be maintained.

7. The device according to claim 6, wherein the resonator and the beam are made of piezoelectric crystal, for example quartz, and wherein the vibration inducer of the resonator are electrodes carried by the torsionally controlled portions of the resonator.

8. The device according to claim 7, wherein the vibration inducer of the beam is in the form of electrodes carried by the beam and connected to a different oscillating electronic loop allowing the flexural vibration of the beam in resonance mode to be maintained, the electrodes of the resonator being electrically independent of the electrodes of the beam which allows the oscillating electronic loops of the resonator and of the beam to work independently of one another.

9. The device according to claim 7, wherein the vibration inducer of the beam is in the form of electrodes carried by the beam and connected to a different oscillating electronic loop allowing the flexural vibration of the beam in resonance mode to be maintained, the electrodes of the resonator and of the beam being electrically connected which allows the beam to be excited over its entire length.

10. A method of using a device for measuring the temperature of a flexurally vibrating beam of a vibrating beam sensor, the method comprising:
    positioning a vibrating element operating in resonance mode by virtue of an oscillating electronic circuit, the resonance frequency of which as a function of the temperature is known, in such a manner that its temperature is representative of the mean temperature of the vibrating beam;
    measuring the frequency of vibration of the vibrating element; and
    evaluating the mean temperature of the vibrating beam on the basis of the measurement of the frequency of vibration of said vibrating element;
wherein:
    the positioning of said vibrating element, which vibrates torsionally at a resonance frequency substantially different from that of the beam and has a torsional vibration node is carried out in such a manner that said element is fixed, in the region of said node, directly to the beam, in the vicinity of the middle of its length, said fixing permitting heat transfers between the vibrating element and said beam, by virtue of which the temperature of said element and the variations, even rapid variations, of that temperature are very substantially equal to the mean temperature of said beam and to the variations, even rapid variations, of that temperature, respectively;
    evaluating, on the basis of at least two successive measurements of the torsional vibration frequency of the vibrating element, the variation over time of said frequency; and
    evaluating the variation over time of the mean temperature of the vibrating beam, on the basis of the evaluation of the variation over time of said frequency.

11. The method according to claim 10, further comprising:
    measuring the frequency of the vibrating beam; and
    evaluating the input quantity to be measured by the sensor by compensating, by a model, the effects of the temperature and its variation on the operation of said sensor, so as to obtain a more precise evaluation of that input quantity, said compensation being made on the basis on the one hand of the evaluations of the mean temperature of the vibrating beam, the evaluation of its variation over time, the measurement of the frequency of vibration of the beam, and on the other hand of a model expressing said frequency as a function of said input quantity, of the temperature and of the variation over time of temperature.

12. The method according to claim 11, wherein said vibrating beam sensor is a differential sensor having two vibrating beams each equipped with a temperature measuring device according to the invention, said method being used to compensate the effects of the temperature on the frequency of each of the beams.

13. The method according to claim 11, wherein the measurement of the frequency of the vibrating element is carried out simultaneously with the measurement of the frequency of the beam.

14. The method according to claim 13, wherein said vibrating beam sensor is a differential sensor having two vibrating beams each equipped with a temperature measuring device according to the invention, said method being used to compensate the effects of the temperature on the frequency of each of the beams.

\* \* \* \* \*